L. HEUSER.
COMBINATION STROPPING DEVICE AND SAFETY RAZOR.
APPLICATION FILED APR. 26, 1918.
1,301,437.
Patented Apr. 22, 1919.
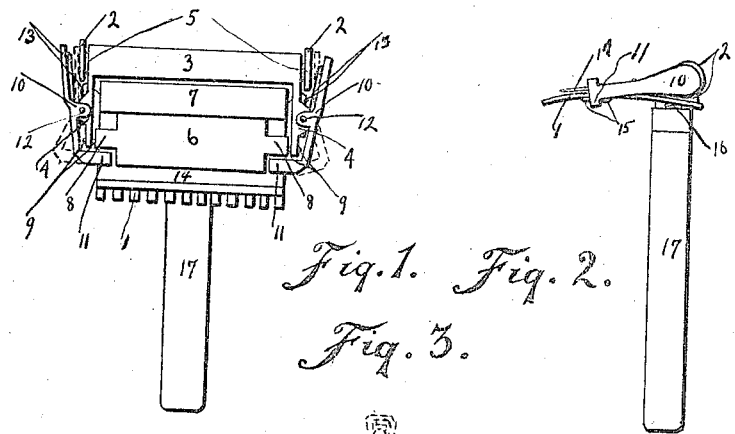
Fig. 1.  Fig. 2.
Fig. 3.
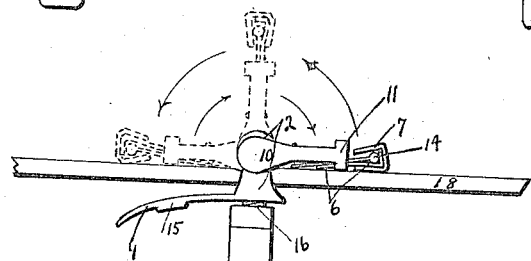
Fig. 4.  Fig. 5.
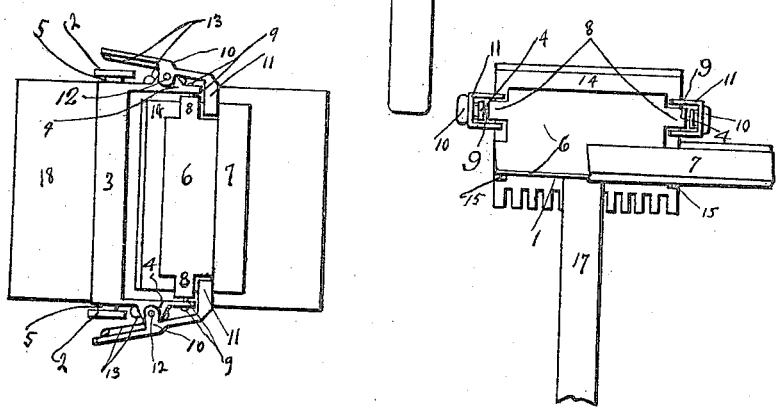
WITNESSES.
Irene E. Schwarzenberg.
Peter Braun.
INVENTOR.
Leonard Heuser

UNITED STATES PATENT OFFICE.

LEONARD HEUSER, OF NEW YORK, N. Y.

COMBINATION STROPPING DEVICE AND SAFETY-RAZOR.

1,301,437.  Specification of Letters Patent.  Patented Apr. 22, 1919.

Application filed April 26, 1918.   Serial No. 231,047.

*To all whom it may concern:*

Be it known that I, LEONARD HEUSER, a citizen of the United States, residing at 513 East 145th street, New York city, in the county of Bronx and State of New York, have invented new and useful Improvements in Combination Stropping Devices and Safety-Razors.

This invention relates to a device for stropping safety razor blades, combined with a device for shaving. Blades easily inserted, and every part of device easily cleaned.

I attain these objects by the mechanism illustrated in the drawing, in which:—

Figure #1 is a top view of the device showing same in position ready for shaving.

Fig. #2 is a side view of the device ready for shaving.

Fig. #3 is a side view of the device, in action, set on strop and stropping the blade.

Fig. #4 is a top view of the device in action, set on strop, and stropping the blade.

Fig. #5 is a rear view of the device, showing manner of inserting the blade, and device in position for cleaning.

Similar numerals refer to similar parts throughout the several views.

1 is the frame with a comb at its forward end, #2 an arm bent upward, from each side near the back of the frame, said arms having one hole each, in the center near the top. #3 a hollow roller with projections #4 solidly fastened at each end, each projection having a hole near its forward end, and in the middle of each projection a small lip on each side bent outwardly, said lips having holes in their center. #5 is a hollow pivot, said pivot passes through the holes of the arms #2, and the hollow of roller #3 thereby movably holding the roller #3 and arms #2 and thus frame #1 together. #6 is the blade holder, the rear end of this holder is bent slightly upward, giving the holder the shape of an L. #7 is the cover for the holder, U shaped: #8 a lip, on each side of the holder #6, these lips are bent inwardly at the ends, making these lips L shaped, a hole in the center of the flat side, in the short bent end of each lip. The blade is placed in the L of holder #6, and cover #7 is slid over both, thus #6 and #7 combined hold the blade firm. #9 are rivets, passing through the holes of projection #4 and lips #8 thus movably fastening the blade holder #6 to projection #4 and thus to roller #3. The clamps #10, have forked ends #11, bent inwardly. Said clamps have in the middle small lips on each side, provided with a hole in the center of the lips. The space between the lips on each side of each of the clamps #10 is large enough to permit each of the projections #4 to set between them. Rivets #12 movably hold clamps #10 and projections #4 together. #13 are wire springs, placed between clamps #10 and projections #4, passing between the lips of projections #4 and around rivets #12. The one end of each of the springs, presses against the outside of one of the projections #4, and the other end against the inner side of one of the clamps #10. The blade #14 is flat, with a round back, at its longer rear end, and the edge at its other long end. #15 are small lips, at the bottom, on each side, adjacent to the comb, bent flat onto the frame #1. In the center of the frame #1 near the rear ends is a threaded hole #16, this threaded hole receives the threaded end of the handle #17. Thus the handle is removable. The same handle can be used in both, stropping or shaving. The strop is represented by #18. A space large enough to permit the strop #18 being passed through, is provided between roller #3 and the frame #1.

The blade holder #6 being movably attached to roller, #3; by means of the lips #8, projections #4 and rivets #9, make it possible to completely turn the holder around. Thus when the device is set for shaving as per Figs. #1 and #2, the holder #6 with blade #14 and cover #7 is doubled between the projections #4 of roller #3, and said holder #6 lies flat on the frame #1, only the teeth of the comb projecting beyond the edge of the blade. The forked ends #11 of the clamps #10, one each on the right and left side of the device, hold the blade #14 holder #6 and cover #7 tight to the frame. #1, one tooth of each forked end resting on the upper surface of the blade, while the other tooth of each of the forked ends, rests on each of the lips, #15, on the under side of the frame, #1. The springs, #13, one between each clamp and projection, force the forked ends of the clamps inwardly, thus aiding in holding the blade, #14, holder #6, and cover, #7, tight to the frame, #1.

To set the blade for stropping, the clamps are pressed inwardly at the upper thumb ends, thus forcing the two wings of the springs together, and the forward ends of the clamps, #10, namely the forked ends #11 outwardly, thus free from the frame #1 and blade #14. The blade holder #6 with cover #7 and blade #14 are then turned around, so the edge of the blade faces the roller #3, as in illustration Figs. #3 and #4. The pressure on the thumb ends of the clamps #10 being withdrawn, the springs #13 naturally force the forked ends #11 of clamps #10 inwardly, one tooth of each clamp on top, the others on the under side of the blade, and into the spaces provided between the lips #8 of holder #6 and cover #7. The space, between the teeth of each forked end, being larger than the thickness of the blade gives the blade #14, and holder #6 and cover #7 sufficient room, to move the fraction of a circle, right and left. The strop is passed into the space between roller #3 and frame #1. Thus the arms #2 of the frame #1, the roller #3 with projections #4 and clamps #10, also blade #14 with holder #6 and cover #7 are on the upper side of the strop, and the frame #1 with the flat lips #15 and the comb, as well as the handles #17 are below the strop #18. The roller #3 presses against the upper surface of the strop #18. By pushing the handle #17 forward and backward, the roller #3 throws the projections #4 and clamps #10 as well as the holder #6 and cover #7 and blade #14 from one side to the other. The holder #6 being movably attached, by means of the downward pressure upon projections #4, forces the edge of the blade #14 to the strop #18. The cover #7 touches the strop on the outer end, bringing the edge of the blade into correct position, the gliding forward and back on the strop of the edge of the blade, sharpens the same.

To remove or replace the blade, as per illustrations Fig. #5, the clamps #10 are pressed at the thumb ends inwardly, thus forcing outwardly the other forked ends #11, and release same from frame #1 and blade #14: the holder #6 with cover #7 and blade #14, is then turned half around between the projections #4, pressure released from thumb ends of clamp #10, will leave, forked ends #11, free. The cover #7 is now pushed free and off the holder #6 and blade #14, the blade #14 will now drop off from holder #6. To replace the blade, it is laid with the back against the small bent end of holder #6, and U shaped cover #7 slid over the holder #6 and blade #14.

It can thus be seen that every part of the device is open and is very easily cleaned. The device is made out of metal excepting the strop made of leather or similar material.

I do not claim as new a device for stropping razor blades or safety razor, knowing that such devices have been on the market for years. What I claim as new is the combination of a simpler, better and more durable device for stropping and shaving.

I claim:

1. In a device—a frame having a lip doubled to the bottom at the right and left sides thereof—and adjacent to the comb at the forward end of said frame—two projections facing straight upward one on each side near the rear of said frame—said projections having holes near the upper ends; said lips, comb and projections being integral parts of said frame.

2. In a device—a frame having as integral parts thereof—a comb at its forward end, a lip each at both sides to the bottom and adjacent to the comb thereof—two projections facing upward and located one on each side near the rear thereof—said projections having holes near the ends—a hollow roller with an arm on both ends, and means to movably hold a clamp on each arm, and a blade holder movably fastened to the ends of the two arms, and all directly movably fastened to the frame—by means of a pivot passing through said holes near the ends of said projections on said frame, and through the hollow roller—and means for working in combination of said roller, clamps, bladeholder and frame, to set the device for both shaving and stropping purposes as herein described.

3. In a device, a frame, with a hollow roller movably attached between two projections on said frame, by means of a pivot, an arm solidly attached to each end of said roller, said arms having holes near the end, two lips with holes in their center, one lip on each side, said lips bent outwardly and being solid parts of said arms, a blade holder, with back bent upward and a lip on each side, said lips bent upward at the ends a hole in the middle of each lip on the upward bend, said blade holder being movably attached to said arms by means of rivets; two clamps, with forked ends bent inwardly—lips one on each side in the middle of said clamps, holes in the center of said lips, said clamps, movably fastened one on each of said arms by means of rivets: wire springs one between each of said arms and clamps,—said clamps and springs serving the double function as stops for blade in stropping and lock in shaving.

4. In a device, a frame, a roller movably attached thereto, arms attached to said roller, movable clamps and springs attached to said arms, a blade holder, the back end bent upward, a lip in the middle of each side of said holder, said lips being bent inward at the ends, with holes in the center of the bent ends, a three sided hollow detachable cover, to slide over, back and sides of said blade holder, said blade holder movably attached between and to said arms by means of rivets, and means for setting device for stropping and shaving.

5. The combination of a device consisting of a frame with a lip at each side at the bottom and adjacent to the comb on the forward end of the frame—a projection one on each side near the rear of the frame—said projections having holes near the ends—said lips, comb and projections being integral parts of the frame—means for fastening a handle to the bottom of the frame, a hollow roller movably attached between the two projections by means of a pivot—an arm solidly attached to each end of said roller, said arms having holes near the forward ends, and by means of rivets movably attached thereto a blade holder, in the middle of said arms, bent outwardly and part thereof—two lips with holes in their center, and by means of rivets movably attached thereto two clamps—one on each arm—said clamps, having forked forward ends bent inwardly, and lips turned inwardly in about the center of said clamps one on each side—said lips and forked ends being integral parts of said clamps—the lips of the clamps arranged to fit over the lips on the arms—and through the holes in the center of the lips movably fastened by means of rivets; wire springs one each fitted into the space between the arms and the clamps—said springs set to cause the forked ends of the clamps to press inwardly and thus the forked ends of the clamps engage the frame and lips thereon and the blade when the device is set for shaving, and hold the blade in proper alinement between the forked ends when the device is set for stropping.

6. In a device—a frame having as integral parts thereof a comb at its forward end, adjacent thereto at the bottom a lip at each side, and facing upward from each side near the rear thereof a projection with holes near the ends of said projections—working in combination herewith—a hollow roller having an arm at each end with two lips with holes in the center facing outwardly from the middle of said arms one on each side thereof, movably fastened through the holes by means of rivets at the forward ends of said arms a blade holder, the back of said bladeholder turned upwardly—and on said bladeholder a lip on each side turned upwardly and holes in the center of the lips and movably fastened by means of rivets passing through the holes of said lips and holes near the ends of said arms—a three-sided U shaped cover to slide over the back of said bladeholder,—two clamps having forked forward ends bent inwardly and two lips one on each side of the middle thereof and bent inwardly and having holes in the center of said lips—said clamps movably attached by means of rivets passing through the holes in the lips on said clamps and said lips on said arms—, a wire spring between each of said clamps and arms, designed to press the forked ends of the clamp inwardly—the rear ends of the clamps acting as thumbpieces in releasing the clamps—said forked ends of the clamps engaging the lips under the frame and blade between them when device is set for shaving, and the blade between the two forked ends when the device is set for stropping—means for fastening a handle to the bottom of said frame—and said hollow roller being movably fastened to the frame by means of a pivot passing through the holes in the projections on said frame and the hollow roller, a space being provided between the roller and frame to admit the strop—thus the combination working together make it possible to set the device for both stropping and shaving purposes.

LEONARD HEUSER.

Copies of this patent may be obtained for five cents each, by addressing the "Commissioner of Patents, Washington, D. C."